(12) United States Patent
Janowicz, Sr. et al.

(10) Patent No.: US 9,016,995 B1
(45) Date of Patent: Apr. 28, 2015

(54) SELF-COUNTERSINKING FASTENER

(71) Applicants: Ronald John Janowicz, Sr., Crown Point, IN (US); Karin Erika Mason, Crown Point, IN (US)

(72) Inventors: Ronald John Janowicz, Sr., Crown Point, IN (US); Karin Erika Mason, Crown Point, IN (US)

( * ) Notice: Subject to any disclaimer, the term of this patent is extended or adjusted under 35 U.S.C. 154(b) by 0 days.

(21) Appl. No.: 14/449,223

(22) Filed: Aug. 1, 2014

Related U.S. Application Data

(60) Provisional application No. 61/958,653, filed on Aug. 2, 2013.

(51) Int. Cl.
  *F16B 35/06* (2006.01)

(52) U.S. Cl.
  CPC .................................. *F16B 35/065* (2013.01)

(58) Field of Classification Search
  USPC ........ 411/387.1, 387.4, 387.7, 399, 402, 411, 411/412, 424, 426
  See application file for complete search history.

(56) References Cited

U.S. PATENT DOCUMENTS

| | | | |
|---|---|---|---|
| 388,000 A * | 8/1888 | Rider | 411/399 |
| 446,741 A * | 2/1891 | Jones | 411/393 |
| 755,804 A * | 3/1904 | Smith | 411/402 |
| 877,131 A * | 1/1908 | Searelle | 411/399 |
| 1,235,626 A * | 8/1917 | Woodward | 411/421 |
| 1,764,053 A * | 6/1930 | Reed et al. | 470/10 |
| 2,201,087 A * | 5/1940 | Hallowell | 411/168 |
| 2,778,265 A * | 1/1957 | Brown | 411/393 |
| 2,877,681 A * | 3/1959 | Brown | 411/393 |
| 4,697,969 A * | 10/1987 | Sparkes | 411/387.7 |
| 4,778,319 A | 10/1988 | Schule | |
| 4,878,793 A * | 11/1989 | Hewison | 411/387.2 |
| 5,019,079 A * | 5/1991 | Ross | 606/312 |
| 5,074,728 A * | 12/1991 | Hsu | 411/387.3 |
| 6,030,162 A * | 2/2000 | Huebner | 411/413 |
| 6,250,866 B1 | 6/2001 | Devine | |
| 6,402,448 B1 | 6/2002 | Dicke | |
| 7,293,947 B2 * | 11/2007 | Craven | 411/387.2 |
| 8,371,787 B2 | 2/2013 | Sugawara et al. | |
| 2008/0031705 A1* | 2/2008 | Severns | 411/413 |

* cited by examiner

*Primary Examiner* — Roberta Delisle
(74) *Attorney, Agent, or Firm* — Hartman Global IP Law; Gary M. Hartman; Michael D. Winter

(57) ABSTRACT

A fastener includes a cylindrical shaft, a screw head located at an uppermost portion of the cylindrical shaft and comprising a tool indentation therein, a threaded portion on the cylindrical shaft comprising a plurality of external threads, and a countersinking portion located between the threaded portion and the screw head and comprising a cutting section. The countersink portion is tapered from a first diameter equal to a diameter of the threaded portion to a second diameter that is equal to or larger than a diameter or a maximum width of the screw head. The countersinking portion is configured to form a countersink hole in a receiving material as the fastener is rotated and forced into the receiving material.

20 Claims, 3 Drawing Sheets

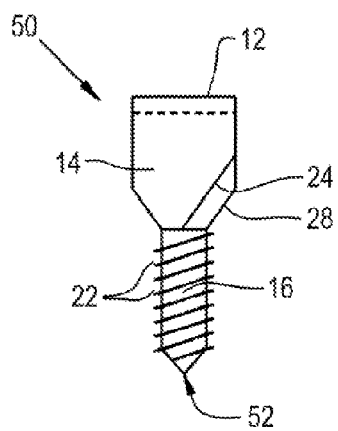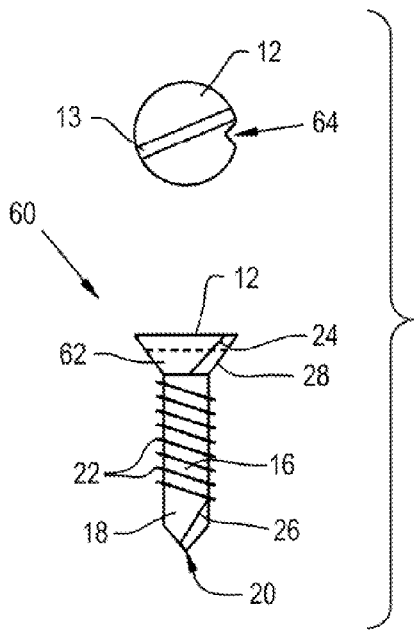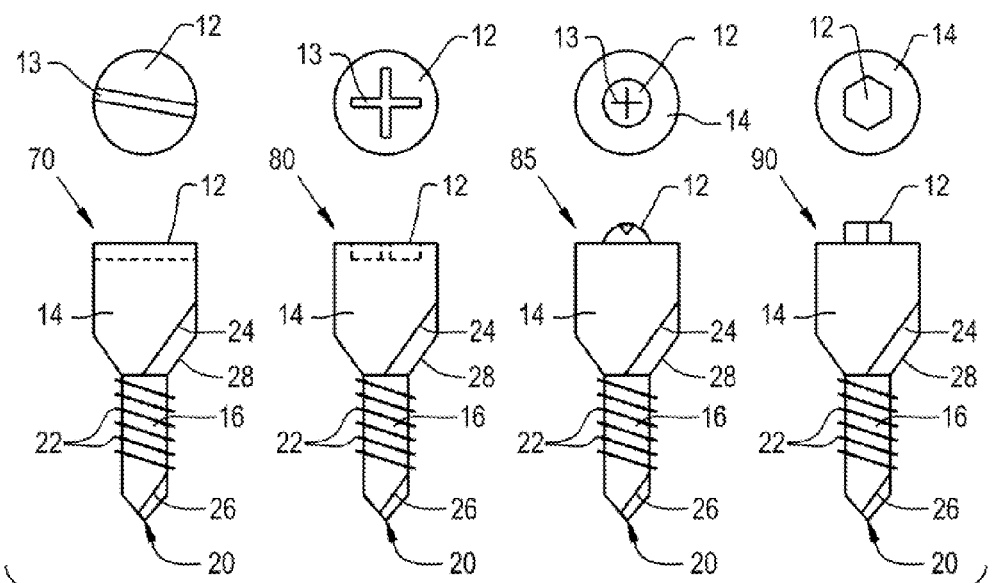
Fig. 5    Fig. 6
Fig. 7

SELF-COUNTERSINKING FASTENER

CROSS REFERENCE TO RELATED APPLICATIONS

This application claims the benefit of U.S. Provisional Application No. 61/958,653, filed Aug. 2, 2013, the contents of which are incorporated herein by reference.

BACKGROUND OF THE INVENTION

The present invention generally relates to fasteners. More particularly, this invention relates to self-countersinking fasteners configured to form a countersink hole.

Fasteners such as nails, bolts, and screws are well known in the art to hold together all types of materials including wood, metal, plastics, etc. Generally, properly installing a screw requires that one drills a pilot hole first in order to avoid cracking a receiving material due to compression. In addition, if the head of the screw is larger than the shank, and one wishes to have the top of the head flush with the receiving surface, a countersink hole must be drilled for the screw. Depending on the screw being used, this process may require multiple drills or drill-bits, and multiple steps in order to install the screw which adds to the overall construction time. To save time and reduce the steps involved in fastening materials, self-tapping screws were developed that drill their own holes, eliminating the need for a pre-drilled pilot hole. Generally, the point on a distal end of the self-tapping screw has a set of blades, which are used for drilling a pilot hole. The self-tapping screw drills the pilot hole prior to the threads of the screw entering the receiving material at a diameter that will allow for the screw to be inserted without cracking the material. However, a countersink hole must still be drilled in order for the head of the screw to be flush with the receiving surface.

In view of the above, it can be appreciated that it would be desirable if a fastener was available that was capable of forming a countersink hole without the need for a separate drilling step.

BRIEF DESCRIPTION OF THE INVENTION

The present invention provides a fastener and method of use therefor suitable for self-countersinking to form a countersink hole without the need for a separate drilling step.

According to a one aspect of the invention, a fastener includes a cylindrical shaft, a screw head located at an uppermost portion of the cylindrical shaft and comprising a tool indentation therein, a threaded portion on the cylindrical shaft comprising a plurality of external threads, and a countersinking portion located between the threaded portion and the screw head and comprising a cutting section. The countersink portion is tapered from a first diameter equal to a diameter of the threaded portion to a second diameter that is equal to or larger than a diameter or a maximum width of the screw head. The countersinking portion is configured to form a countersink hole in a receiving material as the fastener is rotated and forced into the receiving material.

According to another aspect of the invention, a fastener includes a cylindrical shaft, a screw head located at an uppermost portion of the cylindrical shaft and comprising a tool indentation therein, a threaded portion on the cylindrical shaft comprising a plurality of external threads, a countersinking portion located between the threaded portion and the screw head and comprising a cutting section, and a self-tapping portion located at a lowermost portion of the cylindrical shaft oppositely disposed the screw head and configured to form a pilot hole in the receiving material as the fastener is rotated and forced into the receiving material. The countersinking portion is tapered from a first diameter equal to a diameter of the threaded portion to a second diameter that is equal to or larger than a diameter or a maximum width of the screw head. The countersinking portion is configured to form a countersink hole in a receiving material as the fastener is rotated and forced into the receiving material.

According to another aspect of the invention, a fastener includes a cylindrical shaft, a screw head located at an uppermost portion of the cylindrical shaft and comprising a tool indentation therein, a first threaded portion on the cylindrical shaft comprising a plurality of external threads, a countersinking portion located between the first threaded portion and the screw head and comprising a cutting section, and a second threaded portion comprising a plurality of external threads and located on the cylindrical shaft between the countersinking portion and the screw head. The countersinking portion is tapered from a first diameter equal to a diameter of the first threaded portion to a second diameter that is equal to or larger than a diameter or a maximum width of the screw head. The countersinking portion being configured to form a countersink hole in a receiving material as the fastener is rotated and forced into the receiving material.

A technical effect of the invention is the ability to form a countersink hole during the normal operation of inserting a fastener into a receiving material. In particular, it is believed that, by including a countersinking portion of the fastener, a countersink hole is formed without the need for an additional drilling step conventionally required in order to countersink a fastener.

Other aspects and advantages of this invention will be better appreciated from the following detailed description.

BRIEF DESCRIPTION OF THE DRAWINGS

FIGS. 3 through 6 represent self-countersinking fasteners in accordance with aspects of this invention.

FIG. 7 represents a variety of types of fastener heads that may be utilized with a self-countersinking fastener in accordance with aspects of this invention.

DETAILED DESCRIPTION OF THE INVENTION

The present invention is generally applicable to fasteners used to connect and secure materials, including but not limited to screws and bolts. Specifically, the present invention provides a fastener and method of use therefor suitable for forming a countersink hole without the need for a separate drilling step. To facilitate the description of the fastener provided below, the terms "uppermost," "lowermost," "above," "below," etc., will be used in reference to the perspective of the orientation of the fastener represented in FIG. 1, and therefore are relative terms that indicate the construction, installation and use of the invention and therefore help to define the scope of the invention. For convenience, consistent reference numbers are used throughout the drawings to identify the same or functionally equivalent elements.

Figure 1:
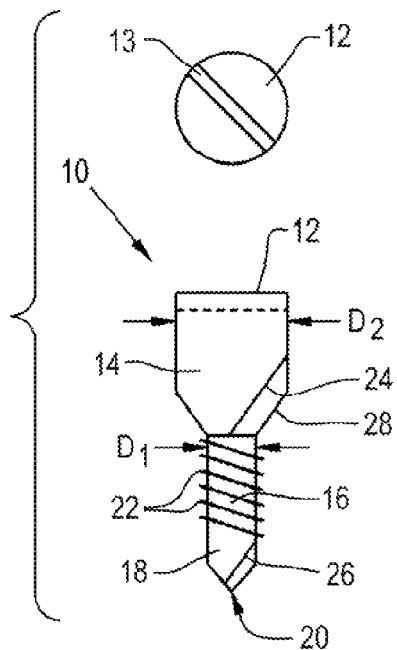
FIG. 1 is side and top views representing a self-countersinking fastener in accordance with an aspect of this invention.

FIG. 1 represents a screw 10 according to one aspect of the invention. The screw 10 includes a cylindrical shaft having a screw head 12 at an uppermost portion of the shaft. The head 12 is represented as having a tool indentation 13 formed therein corresponding with a conventional flathead screwdriver. The screw 10 further includes a threaded portion 16 having external threads 22, a self-tapping portion 18 having a pointed end 20 at a lowermost portion of the screw 10 oppositely disposed the head 12 and at least one blade 26. In addition, unlike conventional screws, the screw 10 includes a countersinking portion 14 located between the threaded portion 16 and the head 12 and having at least one cutting section 24. The countersinking portion 14 has a tapered surface 28 increasing an outer diameter of the screw 10 from a first diameter D1 of the threaded portion 16 to a second diameter D2 of the countersinking section 14. One of ordinary skill in the art will appreciate that the external threads 22 may be at an angle other than those shown in the Figures depending on the application desired, for example, left-handed threads or right-handed threads.

Figure 2:
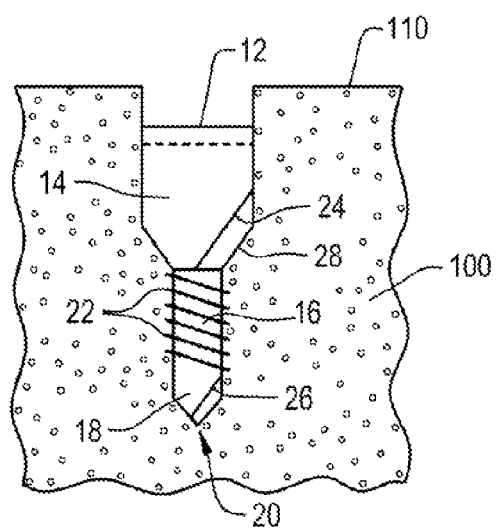
FIG. 2 is a side view representing the self-countersinking fastener of FIG. 1 inserted into a receiving material.

During operation, the pointed end 20 may be located on a surface of a receiving material into which the screw 10 is to be driven. Similar to conventional self-tapping screws, applying a downward force and rotating the screw 10 causes the self-tapping portion 18 to drill a pilot hole in the surface using the at least one blade 26 and once a lowermost thread of the threaded portion 16 reaches the surface, the threads 22 will act to drive the screw into the receiving material and secure the screw 10 therein. Once a lowermost portion of the countersinking portion 14 reaches the surface, the at least one cutting section 24 will increase a diameter of a hole formed by the screw 10 in the surface to a diameter D2 that is at least large enough for the head 12 of the screw 10 to be inserted. Thereafter, the screw 10 may be rotated until the screw 10 is forced into the receiving material to a depth sufficient such that the an uppermost surface of the head 12 is flush or below the surface of the receiving material. FIG. 2 represents the screw 10 inserted into a receiving material 100 so that the head 12 is below a surface 110 of the receiving material 100.

Figure 3:
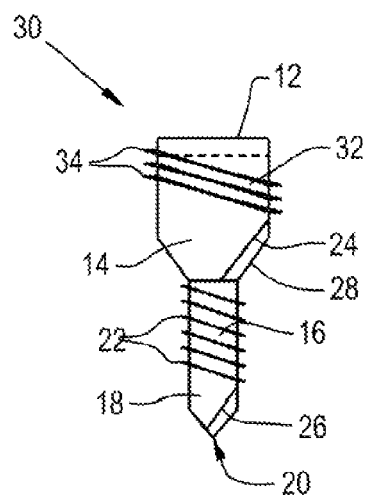
Figure 8:
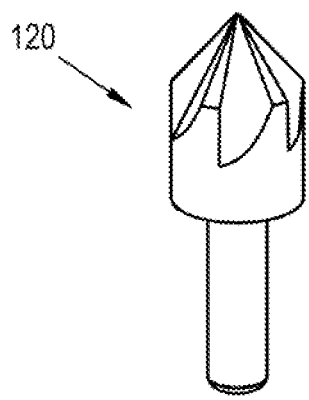
FIG. 8 is a side view representing a conventional countersink drill-bit as known in the art.

As evident from the above, the screw 10 may not only penetrate and bind the receiving material 100 but also forms a countersink hole. To facilitate the countersinking capability, the countersinking portion 14, generally comprising the at least one cutting section 24 and tapered surface 28, is preferably configured to cut into the receiving material 100 similar to a conventional countersinking drill-bit, such as the countersinking drill-bit 120 represented in FIG. 8. The countersinking portion 14 may have a diameter that is equal to or larger than a diameter of the head 12 of the screw 10 if the head 12 is round, or if the head 12 is not round, the countersinking portion 14 may have a diameter that is equal to or larger than a maximum width of the head 12. The cutting section 24 may comprise one or more blades which are used for cutting into the receiving material 100 after passing the thread portion 16. Removed receiving material may be transferred along the blades within a trench on the countersinking portion 14. The blades and trench may extend along the entirety of the tapered surface 28, to the uppermost portion of the shaft (as shown in FIG. 6), or to an additional threaded portion 32 (as shown in FIG. 3) discussed below. Preferably, the cutting section 24 is configured to cut a hole in the receiving material 100 that is deep enough to allow an uppermost portion of the head 12 of the screw 10 to rest below the surface 110 of the receiving material 100 as represented in FIG. 2.

Figure 4:
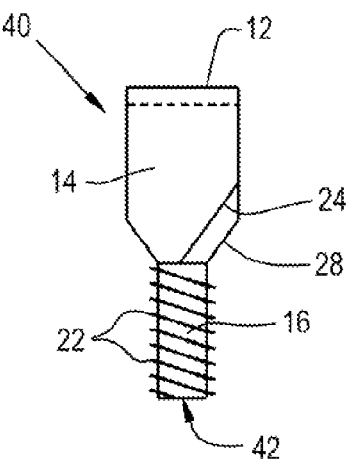

FIGS. 3 through 6 represent exemplary alternative embodiments of fasteners in accordance with aspects of the present invention. FIG. 3 represents a screw 30 comprising a similar structure to the screw 10 of FIG. 1, except with the additional threaded portion 32 having threads 34 located between the countersinking portion 14 and the head 12. The additional threaded portion 32 may assist in driving the screw 30 into a receiving material to a depth below a surface of the receiving material. FIG. 4 represents a bolt 40 having a substantially planar end 42 at a lowermost end of the threaded portion 16 and oppositely disposed the head 12. In such an embodiment, it is foreseeable that threads 22 are configured to mate with interior threads of a nut (not shown) as common in the art for nuts and bolts. FIG. 5 represents a screw 50 that does not include a self-tapping portion 18 and instead includes a pointed end 52 at a lowermost portion of the cylindrical shaft and oppositely disposed the head 12 with the threads 22 continuing about the cylindrical shaft substantially to a tip of the pointed end 52. FIG. 6 represents a screw 60 that includes a countersink portion 62 having a tapered surface 28 along an entire height of the countersink portion 62. Optionally, the head 12 may include a notch 64 resulting from the cutting portion 24 extending through and being continuous throughout an entire height of the countersink portion 62. It should be understood that the figures are provided to illustrate various exemplary structures that the self-countersinking fastener may have and are not intended to limit the structure of the fastener to those structure represented in the figures. It should further be understood that structural features represented in one embodiment may be included in any of the other embodiments. For example, it is foreseeable that bolt 40 and screw 50 could additionally comprise the additional threaded portion 32 of FIG. 3.

A countersinking fastener in accordance with aspects of the invention may have a structure corresponding to any fastener type known in the art, including but not limited to structures utilized for screws, self-drilling screws, self-tapping screws, and bolts. The countersinking fastener may be constructed to have any head type known in the art (shape and tool indentation), such as a straight slot head, a phillips head, a hex-shaped head, or a six point star-head. FIG. 7 represents nonlimiting examples of various types of heads on a countersinking fastener structure similar to that shown in FIG. 1, including a straight slot head 70, a phillips head 80, a raised phillips head 85, and a hex-shaped head 90. The countersinking fastener may be formed of any material suitable for fasteners, may include a coating, and may undergo any finishing process or heat treatment known in the art. For example, it is foreseeable that the countersinking fastener may be formed as of zinc-coated steel, aluminum, stainless steel, cobalt steel, brass, or bronze. The countersinking fastener may be produced in a variety of lengths and diameters, including metric and SAE standard sizes. Shaft lengths, diameters, and thread-configurations of the various portions of the countersinking fastener may vary depending on specific applications. The countersinking fastener may be configured to be inserted into a wide variety of receiving materials including wood, metal, plastics, ceramics, and various composite materials. Preferably, the countersinking fastener includes the self-tapping portion 18 to provide a self-tapping capability.

Countersinking fastener as described above eliminate the need for an individual to drill pilot holes for the screws (if the self-tapping portion 18 is included), and the need to drill a countersink hole. By using such fastener, an individual may insert a countersunk fastener into a receiving material in a single step, rather than the two or more steps conventionally required. Conveniently, a self-tapping, self-countersinking fastener according to the present invention preferably requires no pre-drilling. An individual may simply position the fastener as desired, and drive the fastener into the receiving material and therefore, may save a considerable amount of time and labor during large construction projects.

While the invention has been described in terms of specific embodiments, it is apparent that other forms could be adopted by one skilled in the art. For example, the physical configuration of the fastener could differ from that shown, and materials other than those noted could be used. For example, it is foreseeable that other head types (shape and tool indication) may be developed in the future. It should be understood that the present invention is not limited to the head types represented herein and that such head types as may be developed are within the scope of this invention. Therefore, the scope of the invention is to be limited only by the following claims.

The invention claimed is:

1. A fastener comprising:
a cylindrical shaft having a longitudinal axis;
a screw head located at an uppermost portion of the cylindrical shaft, the screw head being configured to mate with a tool configured to rotate the fastener and force the fastener into a receiving material;
a cylindrical portion located on the cylindrical shaft axially lower than the screw head;
a tapered portion located on the cylindrical shaft axially lower than the cylindrical portion, the tapered portion being tapered from a first diameter to a larger second diameter that is equal to or larger than a diameter or a maximum width of the screw head;
a threaded portion located on the cylindrical shaft axially lower than the tapered portion and comprising a plurality of external threads; and
a cutting section located along an axial length of the tapered portion from the first diameter through the second diameter and extending at least partially into the cylindrical portion, the cutting section configured to form a countersink hole having a diameter equal to or greater than the diameter or the maximum width of the screw head,
wherein the cylindrical portion has a diameter equal to the second diameter, the first diameter being equal to a diameter of the threaded portion,
wherein the cutting section forms a countersink hole in the receiving material as the fastener is rotated and forced into the receiving material such that the screw head is located below a surface of the receiving material adjacent the countersink hole.

2. The fastener of claim 1, further comprising a self-tapping portion comprising a means of cutting the receiving material and located at a lowermost portion of the cylindrical shaft oppositely disposed the screw head and configured to form a pilot hole in the receiving material as the fastener is rotated and forced into the receiving material.

3. The fastener of claim 1, further comprising a second threaded portion comprising a plurality of external threads and located on the cylindrical portion.

4. The fastener of claim 1, further comprising a substantially planar end located at a lowermost portion of the cylindrical shaft oppositely disposed the screw head, the threads of the thread portion being configured to mate with internal threads of a corresponding nut.

5. The fastener of claim 1, further comprising a pointed end located at a lowermost portion of the cylindrical shaft oppositely disposed the screw head, wherein the threads of the thread portion continue substantially to a tip of the pointed end.

6. The fastener of claim 1, wherein once the fastener has been rotated and forced into the receiving material, the tapered portion and the threaded portion bind the receiving material.

7. The fastener of claim 1, wherein, other than the cutting section, the tapered section has a linear surface from the first diameter to the second diameter.

8. The fastener of claim 1, wherein the screw head is one chosen from the group consisting of a straight slot head, a phillips head, a hex-shaped head, or a six point star-head.

9. A fastener comprising:
a cylindrical shaft;
a screw head located at an uppermost portion of the cylindrical shaft, the screw head being configured to mate with a tool configured to rotate the fastener and force the fastener into a receiving material;
a threaded portion on the cylindrical shaft comprising a plurality of external threads; and
a countersinking portion located between the threaded portion and the screw head and comprising a cutting section, the countersinking portion being tapered from a first diameter equal to a diameter of the threaded portion to a second diameter that is equal to or larger than a diameter or a maximum width of the screw head,
wherein the countersinking portion forms a countersink hole in the receiving material as the fastener is rotated and forced into the receiving material,
wherein the diameter or the maximum width of the screw head is smaller than the second diameter of the countersinking portion.

10. A fastener comprising:
a cylindrical shaft having a longitudinal axis;
a screw head located at an uppermost portion of the cylindrical shaft, the screw head being configured to mate with a tool configured to rotate the fastener and force the fastener into a receiving material;
a cylindrical portion located on the cylindrical shaft axially lower than the screw head;
a tapered portion located on the cylindrical shaft axially lower than the cylindrical portion, the tapered portion being tapered from a first diameter to a larger second diameter that is equal to or larger than a diameter or a maximum width of the screw head;
a threaded portion located on the cylindrical shaft axially lower than the tapered portion and comprising a plurality of external threads;
a cutting section located along an axial length of the tapered portion from the first diameter through the second diameter and extending at least partially into the cylindrical portion, the cutting section configured to form a countersink hole having a diameter equal to or greater than the diameter or the maximum width of the screw head; and
a self-tapping portion located at a lowermost portion of the cylindrical shaft oppositely disposed the screw head and configured to form a pilot hole in the receiving material as the fastener is rotated and forced into the receiving material,
wherein the cylindrical portion has a diameter equal to the second diameter, the first diameter being equal to a diameter of the threaded portion,
wherein the cutting section forms a countersink hole in the receiving material as the fastener is rotated and forced into the receiving material such that the screw head is located below a surface of the receiving material adjacent the countersink hole.

11. The fastener of claim 10, further comprising a second threaded portion comprising a plurality of external threads and located on the cylindrical portion.

12. The fastener of claim 10, once the fastener has been rotated and forced into the receiving material, the tapered portion and the threaded portion bind the receiving material.

13. The fastener of claim 10, wherein, other than the cutting section, the tapered section has a linear surface from the first diameter to the second diameter.

14. The fastener of claim 10, wherein the diameter or the maximum width of the screw head is smaller than the second diameter of the countersinking portion.

15. The fastener of claim 10, wherein the screw head is one chosen from the group consisting of a straight slot head, a phillips head, a hex-shaped head, or a six point star-head.

16. A fastener comprising:
   a cylindrical shaft having a longitudinal axis;
   a screw head located at an uppermost portion of the cylindrical shaft, the screw head being configured to mate with a tool configured to rotate the fastener and force the fastener into a receiving material;
   a first threaded portion located on the cylindrical shaft axially lower than the screw head and comprising a plurality of external threads;
   a tapered portion located on the cylindrical shaft axially lower than the first threaded portion, the tapered portion being tapered from a first diameter to a larger second diameter that is equal to or larger than a diameter or a maximum width of the screw head;
   a second threaded portion located on the cylindrical shaft axially lower than the tapered portion and comprising a plurality of external threads; and
   a cutting section located along an axial length of the tapered portion from the first diameter through the second diameter and extending at least partially into the cylindrical portion, the cutting section configured to form a countersink hole having a diameter equal to or greater than the diameter or the maximum width of the screw head; and
   wherein the first diameter is equal to a diameter of the second threaded portion,
   wherein the cutting section forms a countersink hole in the receiving material as the fastener is rotated and forced into the receiving material such that the screw head is located below a surface of the receiving material adjacent the countersink hole.

17. The fastener of claim 16, further comprising a self-tapping portion located at a lowermost portion of the cylindrical shaft oppositely disposed the screw head and configured to form a pilot hole in the receiving material as the fastener is rotated and forced into the receiving material.

18. The fastener of claim 16, further comprising a substantially planar end located at a lowermost portion of the cylindrical shaft oppositely disposed the screw head, the threads of the thread portion being configured to mate with internal threads of a corresponding nut.

19. The fastener of claim 16, further comprising a pointed end located at a lowermost portion of the cylindrical shaft oppositely disposed the screw head, wherein the threads of the thread portion continue substantially to the a tip of the pointed end.

20. The fastener of claim 16, wherein the diameter or the maximum width of the screw head is smaller than the second diameter of the countersinking portion.

* * * * *